United States Patent [19]

Kobayashi

[11] Patent Number: 5,058,426
[45] Date of Patent: Oct. 22, 1991

[54] FLOW RATE SENSOR

[75] Inventor: Hiroshi Kobayashi, Kanagawa, Japan

[73] Assignee: Nissan Motor Company, Limited, Kanagawa, Japan

[21] Appl. No.: 352,317

[22] Filed: May 15, 1989

[30] Foreign Application Priority Data

May 16, 1988 [JP] Japan .................. 63-119041

[51] Int. Cl.⁵ .............................. G01F 1/68
[52] U.S. Cl. .................................. 73/204.26
[58] Field of Search ........... 73/204.23, 204.25, 204.26, 73/204.27, 204.95

[56] References Cited

U.S. PATENT DOCUMENTS

| 2,776,565 | 1/1957 | Hudson . | |
|---|---|---|---|
| 4,299,124 | 11/1981 | Knapp et al. | 73/204.27 |
| 4,304,129 | 12/1981 | Kawai et al. . | |
| 4,397,179 | 8/1983 | Romann | 73/204.25 |
| 4,502,239 | 3/1985 | Horn | 73/861.95 |
| 4,633,578 | 1/1987 | Aine et al. | 73/861.23 |
| 4,685,331 | 8/1987 | Renken et al. . | |
| 4,691,566 | 9/1987 | Aine | 73/861.26 |
| 4,776,214 | 10/1988 | Moran et al. | 73/202 |

FOREIGN PATENT DOCUMENTS

DE-C-743788  5/1943  Fed. Rep. of Germany .
1379632  3/1988  U.S.S.R. .................. 73/204.27

Primary Examiner—Herbert Goldstein
Attorney, Agent, or Firm—Lowe, Price, LeBlanc & Becker

[57] ABSTRACT

A flow rate sensor is provided. This sensor includes a flow rate detecting element. The flow rate detecting element is provided within a flow passage so as to expose the flow rate of a medium whether at the center of the passageway or at the inner surfaces of the passage wall. The flow rate detecting element has a plurality of openings for allowing the medium to pass therethrough without pressure loss. Thus, the flow rate sensor may precisely detect the flow rate of a medium flowing within the passage regardless of insecurity in the flow distribution of the medium.

8 Claims, 5 Drawing Sheets

FLOW RATE SENSOR

BACKGROUND OF THE INVENTION

1. Technical Field

The present invention relates generally to a flow rate sensor, and more particularly to a flow rate sensor which is suitable for measuring the flow rate of intake air into an internal combustion engine for example.

2. Background Art

A hot-wire air flow meter as a flow rate sensor is well known in the art. This meter is used for measuring the flow rate of intake air into an internal combustion engine. The meter generally includes a small winding type hot-wire probe which has a relatively great mechanical strength and an air temperature probe for detecting the temperature of intake air. These probes are disposed within a bypass air passage. It will be appreciated that a hot-wire air flow meter may provide a high degree of mechanical strength against the common using conditions of automotive vehicles such as vibrations, thermal shock, and backfire. Miniaturization, ease of mass production, and rapid response time are also attributes of this type of sensor.

However, in such a hot-wire air flow meter, the hot-wire probe as a flow rate detecting element is arranged within a bypass air passage independent of the main air passage. Therefore, flow rate measurement is subject to inaccuracy due to pulsations caused by the opening and closing of the intake valves of the engine which causes flow velocity and distribution to vary continually, creating an extremely insecure condition with asymmetrical distributions therein due to the many curved sections and necessary straight sections within an air passage. Due to spatial restrictions a hot wire type flow rate sensor cannot take such conditions into account.

SUMMARY OF THE INVENTION

It is, accordingly, an object of the present invention to provide a flow rate sensor for detecting the flow rate of a medium precisely even when the flow distribution thereof is insecure within a flow passage.

According to one aspect of the present invention, there is provided an apparatus for measuring the flow rate of a medium (includes liquids and/or gases) within a passage, which comprises a first means for radiating heat energy to the medium flowing within the passage at a plurality of points transversely offset from each other with respect to the flow direction of the medium, a second means for determining the heat quantity transferred from the first means to the medium to provide a signal indicative thereof, and a third means for determining the flow rate of the medium flowing within the passage based on the signal output from the second means.

In the preferred mode, the first means may be a flow rate element which is formed of a resistance film and has a plurality of openings for allowing the medium to flow therethrough without pressure loss. The flow rate element is arranged so as to cover the entire stream area of a diameter section of the passage.

In addition, the flow rate element may take the form of a honeycomb which is disposed transversely to the flow direction within the passage.

According to another aspect of the invention, there is provided an apparatus for measuring the flow rate of air within an intake passage of an internal combustion engine, which comprises a flow rate detecting element, provided within the intake passage, for generating a heat energy to be dissipated to the flowing air at a plurality of points defined on a plane transverse to the flow direction of the air, a first means for determining the amount of heat dissipated to the air by the flow rate detecting element to provide a signal indicative thereof, and a second means for determining the flow rate of the air flowing within the intake passage based on the signal from the first means. The flow rate detecting element has a plurality of openings for allowing the air to flow therethrough without pressure loss.

In the preferred mode, the flow rate detecting element has a surface area (S) and a resistance value (Rw). A temperature sensor for detecting a temperature (Ta) of the air flowing within the intake passage to provide a signal indicative thereof is provided. The first and second means constitutes a control circuit for applying a current to the flow rate detecting element to generate heat having a temperature of (Tw). The control circuit is operable to control the current so as to maintain a value defined by the relation $(Tw-Ta) \times S/Rw$ at a constant level based on the signal output from the temperature sensor to determine the flow rate of the air based on the magnitude of the current applied to the flow rate detecting element.

DESCRIPTION OF THE PREFERRED EMBODIMENT

Figure 1A:
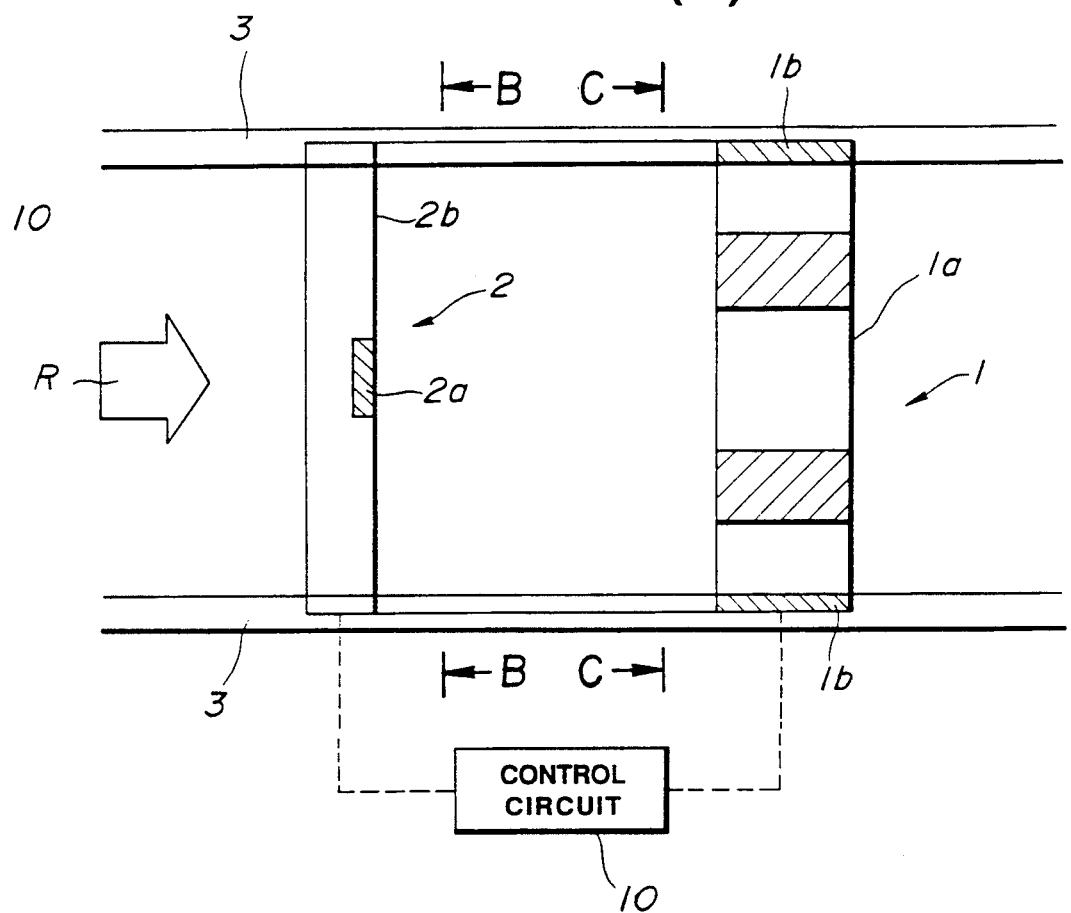
FIG. 1(a) is a sectional view which shows an arrangement of a flow rate sensor according to the present invention and a temperature sensor within a flow passageway.

Referring now to the drawings, particularly to FIG. 1(a), there is illustrated an arrangement of a flow rate sensor 1 according to the present invention and a temperature sensor 2 in an flow passage 10. The flow rate sensor 1 is available as an air flow meter for an internal combustion engine for example. In the flow passage 10, the flow rate sensor 1 and the temperature sensor 2 are mounted perpendicularly to the flow direction R.

Figure 1B:
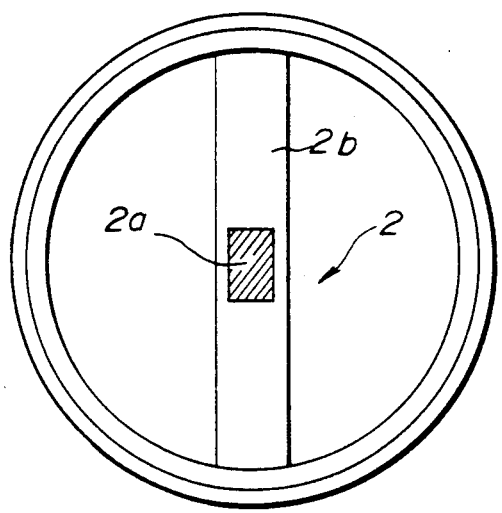
FIG. 1(b) is a front view taken along the line B in FIG. 1(a) which shows a temperature sensor.

Referring to FIG. 1(b), the temperature sensor 2 is shown. This sensor is comprised of a thermistor element 2a and a bar 2b and is operable to measure the temperature of a medium within a passage to provide a signal indicative thereof to a control circuit 10. The bar is made of a ceramic material such as an alumina. The thermistor element is disposed in the center of the bar.

Figure 1C:
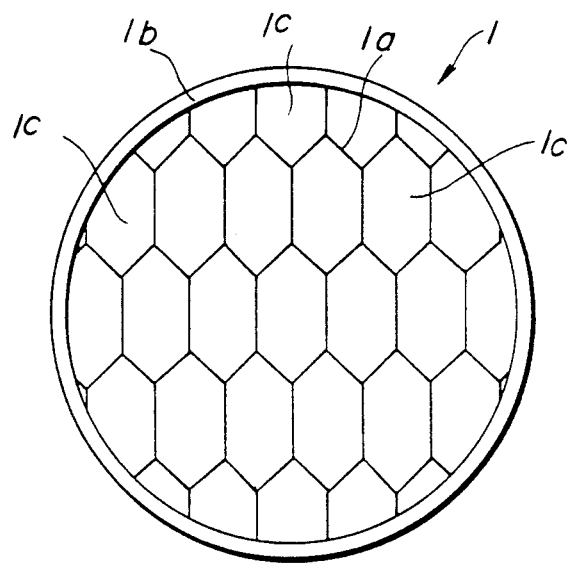
FIG. 1(c) is a front view taken along the line C in FIG. 1(a) which shows a flow rate sensor.

Referring to FIG. 1(c), the flow rate sensor 1 is shown. This sensor comprises honeycomb shaped cells formed of a flow rate detecting element 1a and a circular support member 1b. The support member supports the flow rate sensor 1 within a duct 3 so that the flow rate sensor occupies all flow areas of the flow passage 10. The medium to be measured passes through the spaces 1c in the cells.

Referring to FIG. 2, a process for producing the flow rate sensor is shown. First, a metallic foil 5 is prepared, as shown in FIG. 2(a), which is made of nickel, aluminum, or iron alloys and has a thickness of 50 to 100 ($\mu$m).

Figure 2A:
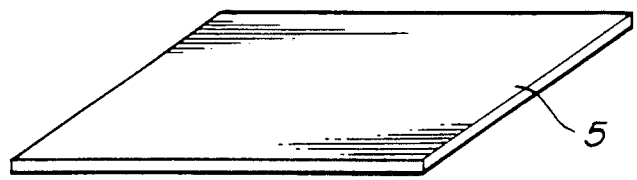
FIGS. 2(a) to 2(e) are perspective views which show a fabrication sequence for a flow rate detecting element of a flow rate sensor.
Figure 2B:
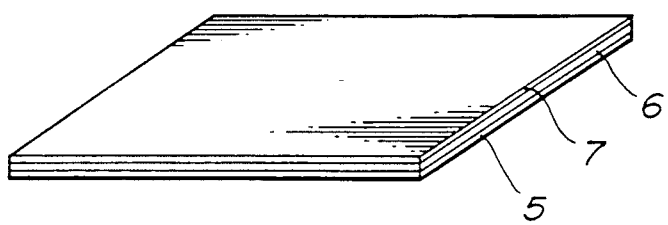

An insulating material such as silicon dioxide is, as shown in FIG. 2(b), then disposed on a surface of the metallic foil 5 by means of a spattering method to form a thin insulating film 6. A resistance material such as platinum, tungsten, or nickel is further evaporated on the surface of the insulating film 6 by means of the same method to form a metallic film 7.

The thin insulating film 6 is made of a plurality of thin layers which are made of silicon dioxide and have a thickness of 1 to 3 ($\mu$m) respectively are laminated by a spattering method to form the insulating thin film having a thickness of 5 to 10 ($\mu$m).

Figure 2C:
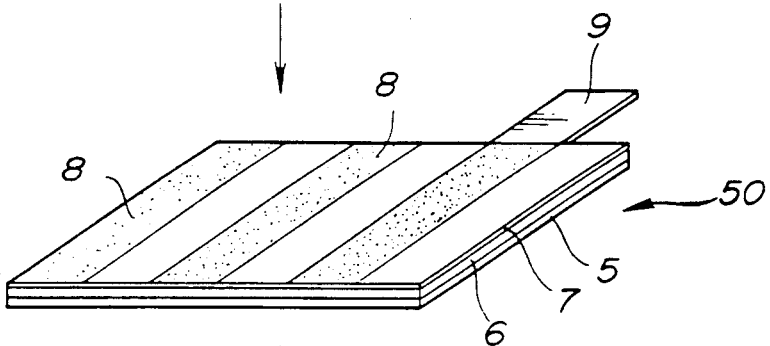
Figure 2D:
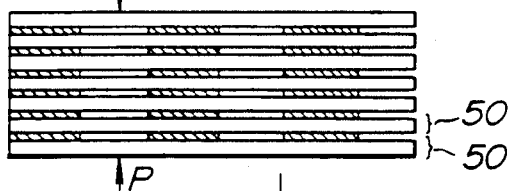
Figure 2E:
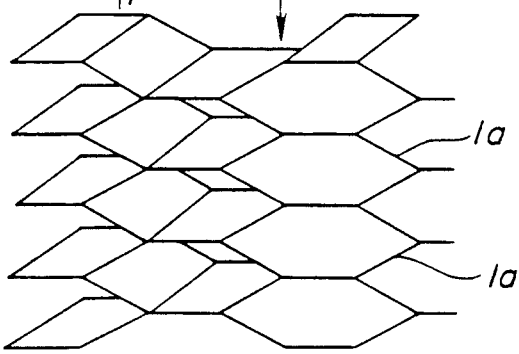

After disposing the films, a laminated member is formed. Subsequently, a conductive paste 8 is applied to the metallic film 7, at a thickness of 20 to 50 ($\mu$m), in strips spaced at predetermined intervals as shown in FIG. 2(c) to form a finished laminated member 50. A plurality of finished laminated members 50 are further laminated to provide a laminated assembly, as shown in FIG. 2(d).

On the uppermost and lowermost finished laminated members, as shown in FIG. 2(c), metallic foil electrode strips 9 are connected to the respective thin metallic films 7 thereof as terminals for the control circuit 10.

With this arrangement, weight loads are supplied against both sides of the laminated assembly from the directions P and the laminated assembly is compressed. It is also dried at a predetermined temperature. After a certain period of time, the compressed laminated assembly is stretched from the top and bottom thereof (against the direction of compression) to obtain the honeycomb shaped flow rate detecting element 1a as shown in FIG. 2(d and e).

Finally, a support member 1b covers the circumference of the flow rate element 1a to form a flow rate sensor 1 (see FIG. 1(c)).

The principle of operation of the flow rate sensor according to the invention will be described hereinbelow. An electric resistance Rw provided by the metallic film 7 of the flow rate detecting element 1a of the flow rate sensor 1 is expressed as follows:

$$Rw = Rw_0(1 + \alpha Tw) \quad (1)$$

Where Tw is a temperature of the metallic film 7. $Rw_0$ is a resistance value of the metallic film 7 at a reference temperature, for example, at 0 degrees. The $\alpha$ is a temperature coefficient of the metallic film 7.

When the application of a current i is provided to the metallic film 7, heat generated thereby, or a heat quantity Q is transferred to the medium at V flow velocity. The heat quantity Q is determined by the following formula;

$$Q = i^2 Rw = \{C_1 + C_2(\sigma V)^{\frac{1}{2}}\} \times (Tw - Ta)S$$

Thus, $$i^2 = \{C_1 + C_2(\sigma V)^{\frac{1}{2}}\} \times (Tw - Ta)S/Rw \quad (2)$$

Where $\sigma$ is the density of the medium flowing through the flow passage. S is the surface area of the metallic film 7. Ta is the temperature of the medium. $C_1$ and $C_2$ are constants.

Thus, as is clear from the above formula (2), by electrically controlling the value of $$(Tw - Ta)S/Rw \quad (3)$$

regardless of the temperature Ta of the medium, the current i may be expressed as a product of the density of the medium and the flow velocity, or a function dependent only upon mass flow rate. The current i may be found to obtain the mass flow rate.

As is well known in the art, various control means which use a signal from a sensor for detecting a temperature Ta of the medium may be provided for maintaining the value of the formula (3) at a constant value. In this embodiment, the control circuit 10 controls a current to be applied to the flow rate sensor 1 based on a temperature signal output from the temperature sensor 2 so as to maintain the value of the formula (3) at a constant value.

A U.S. Pat. No. 4,311,042 to Hoshiya et al. discloses a hot-wire air flow meter for an internal combustion engine. In a system of this invention, a hot-wire and a resistor is disposed within an intake passageway of an intake manifold. A control circuit is provided which will increase the voltage across the hot-wire to compensate for the energy dissipated by the hot-wire so that the temperature of the hot-wire is maintained at a constant value. With this provision, such a hot-wire flow meter may accurately measure the flow rate of the medium. Thus, control circuit 10 may comprise control circuit 16 disclosed in this patent. A U.S. Pat. No. 4,505,248 to Yuzawa et al. discloses a hot-wire air flow meter control system for engine. The contents of these disclosure are hereby incorporated by reference.

The flow rate element 1a, as shown in FIG. 1(a), is provided perpendicularly to the stream direction R of the medium and covers the entire stream area of a diameter section of the passage. Further, the element 1a extends parallel to the flow direction R with a certain thickness.

Figure 3A:
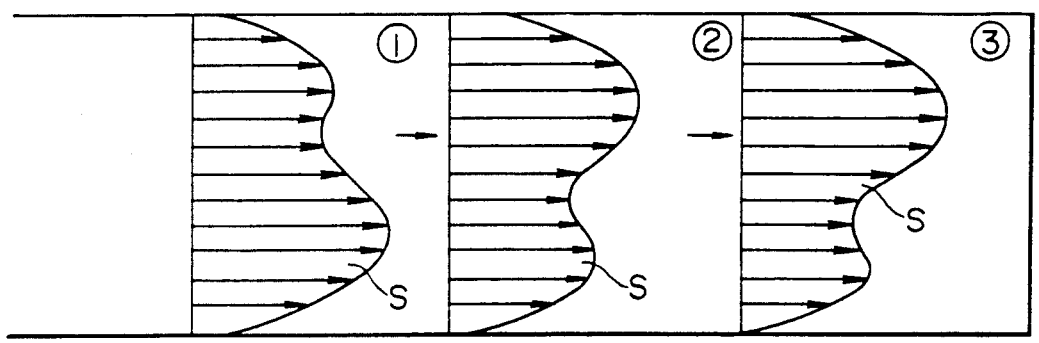
FIG. 3(a) is a graphic depiction of the flow velocity profile of intake air into an engine.

In a flow passage such as an intake manifold of an engine, a medium (air) tends to flow with an insecure flow profile with respect to space and time. In an engine, due to the restricted space within a flow passage, the provision of the necessary lengths of straight sections in the flow passage is difficult. The flow passage includes many curved sections. The intake stream of the engine is therefore subject to extreme insecurity. FIG. 3(a) illustrates the variations per hour of in the velocity profiles of a medium S at a cross section perpendicular to a stream direction within a flow passage. It will be appreciated that the stream of flow into the intake of the engine is spatially insecure.

Figure 3B:
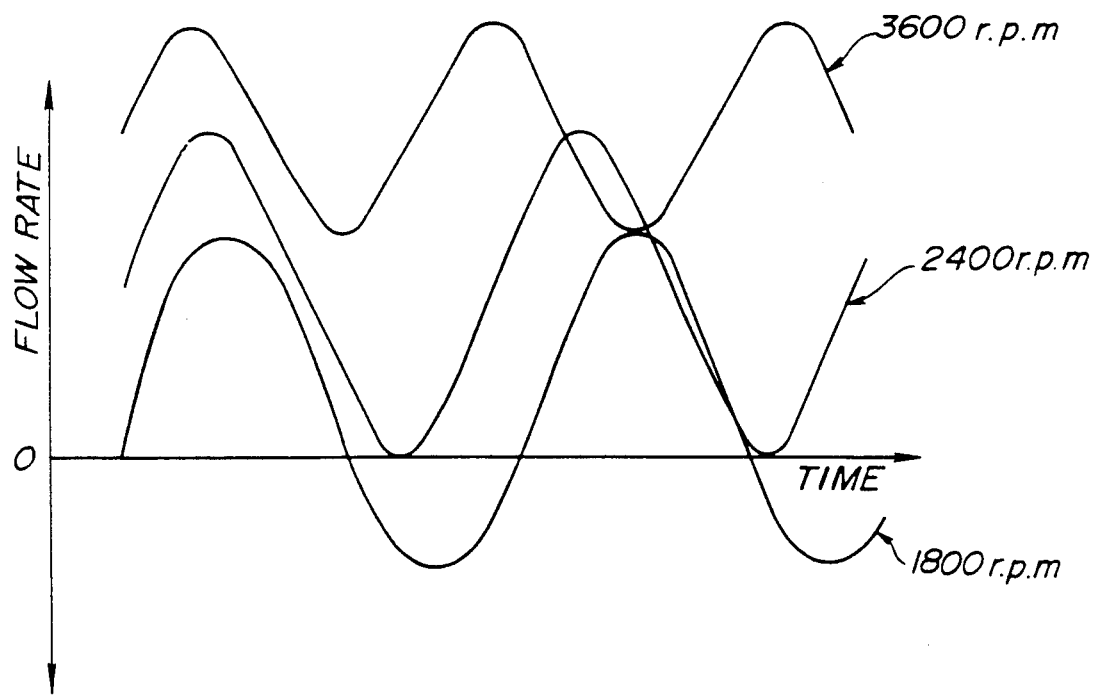
FIG. 3(b) is a graphic depiction of flow rate variations at various engine speeds.
Figure 4A:
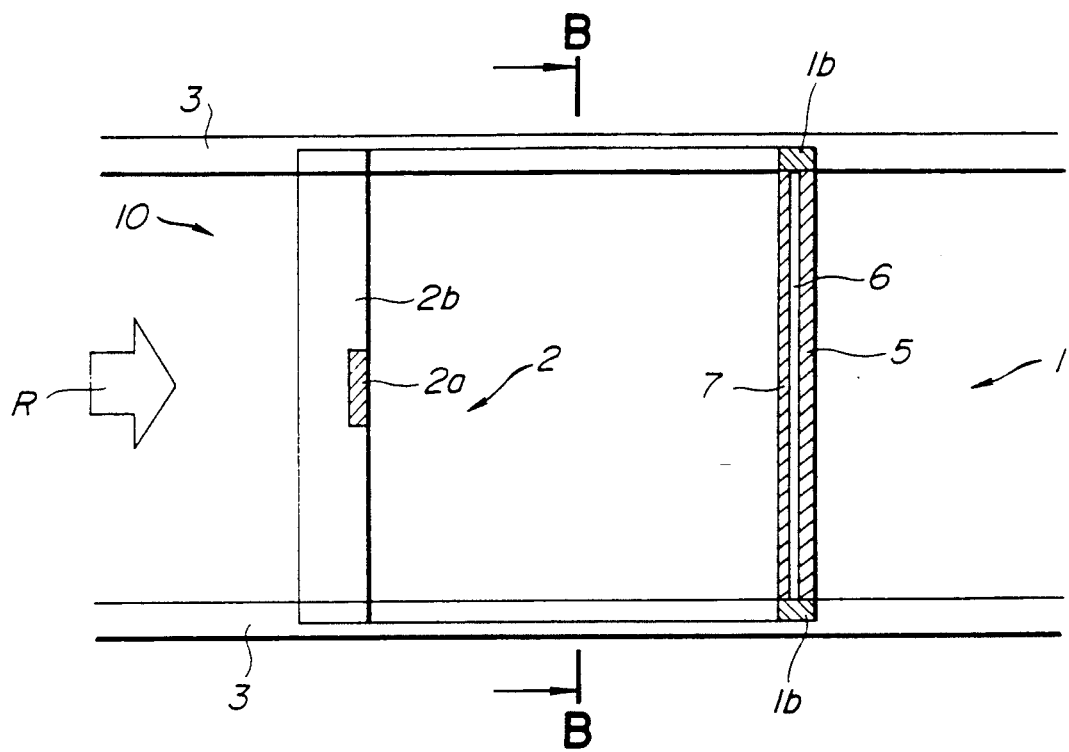
FIG. 4(a) is a sectional view which shows an arrangement of a second embodiment of a flow rate sensor according to the invention within a flow passageway.
Figure 4B:
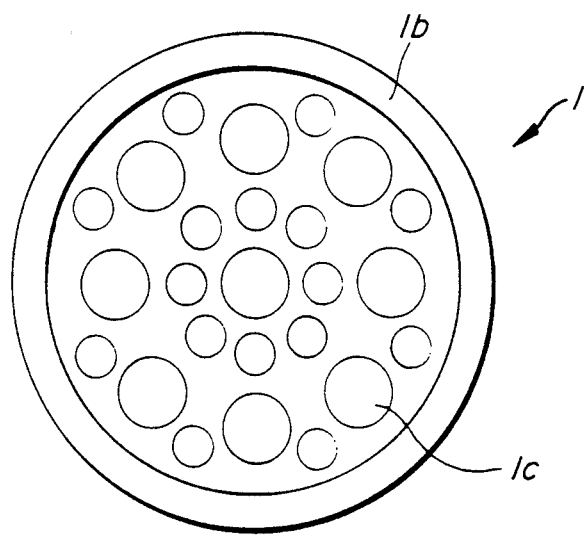
FIG. 4(b) is a front view taken along the line B in FIG. 4(a) which shows a flow rate sensor of a second embodiment.

Further, fluctuation, or pulsation flow which is synchronized with valve timing of an engine cylinder tends to occur in the stream of flow into the intake manifold of an engine. The more the difference in medium pressure between the intake side of a flow passage, where a throttle valve is opened greatly, and the cylinder side is reduced, the greater the magnitude of pulsation flow becomes. FIG. 3(b) illustrates pulsation flow in a medium flowing into the intake when the throttle valve is opened greatly with respect to various engine speeds.

It will be noted that the stream of flow into the intake of the engine is always variable in relation to space and time and is extremely insecure. In order to always measure such an insecure stream precisely as a mean flow rate, the provision of a flow rate element which is disposed perpendicularly to the stream direction so as to cover all areas of a diameter of the flow passage is preferable. Accordingly, in this embodiment according to the invention, the honeycomb shaped metallic film element is provided within a flow passage so as to be arranged perpendicularly to the flow direction of the medium and so as to cover a diameter section of the flow passage. The metallic film element therefore encounters the medium across the entire flowpath from the center of the passageway to the inner surface of the passage walls regardless of momentary variations in the flow stream. Thus, the flow rate detecting element according to the invention can determine the flow rate of a medium passing through the flow passage.

The honeycomb structure of the flow rate element takes the form of cells having openings, so that no pressure loss induced by the flow rate element tends to occur.

For installation of the flow rate element within the flow passage so as to cover all cross area thereof, a method for arranging a mesh of platinum or tungsten wires, or so forth may be proposed. However, with this method, the provision of a retaining means for the mesh within the passage while maintaining the mechanical strength of the wires is difficult. Additionally, the cost for provision of this retaining means is high. For these reasons, the above described retaining means is unsuitable for an automotive vehicle for example.

Moreover, hot wire probes, as described in the prior art, may be arranged at some places within a flow passage. However, the arrangement of a plurality of flow rate elements induces a great pressure loss. The precise detection of a flow rate given average spatial flow variations would require a good many flow rate elements, causing the cost to become high. This method is therefore unsuitable for automotive vehicles.

Referring to FIGS. 4(a) to 5(d), wherein like numbers refer like parts in FIG. 1 and description thereof will be omitted, a second embodiment of a flow rate sensor according to the invention is shown. This flow rate sensor 1 includes a disk shaped of metallic foil 5. An insulating film 6 and a metallic film 7 are laminated on the metallic foil 5 as a resistance member and a plurality of openings 1c are provided therein. The total aperture area of the openings 1c are more than or equal to 30 percent of a surface area of the flow rate sensor 1. This sensor is adapted for providing no pressure loss when medium passes therethrough.

FIGS. 5(a) to 5(d) shows a process for producing the flow rate sensor 1 of the second embodiment. Materials to be used and the thicknesses thereof are similar to the above first embodiment.

Figure 5A:
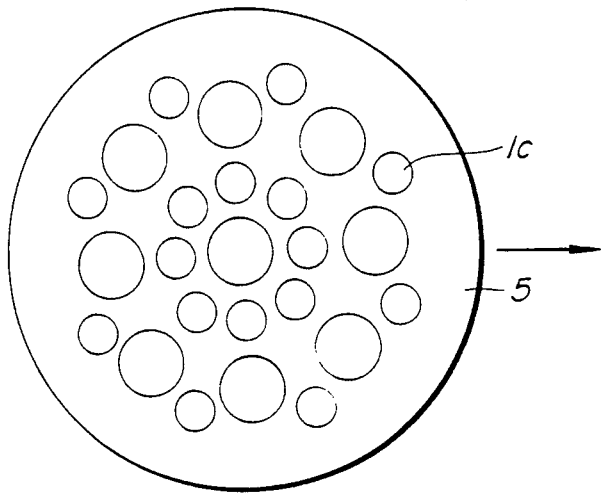
FIGS. 5(a) to 5(d) is front view which shows a fabrication sequence for a flow rate detecting element of a flow rate sensor of a second embodiment.
Figure 5B:
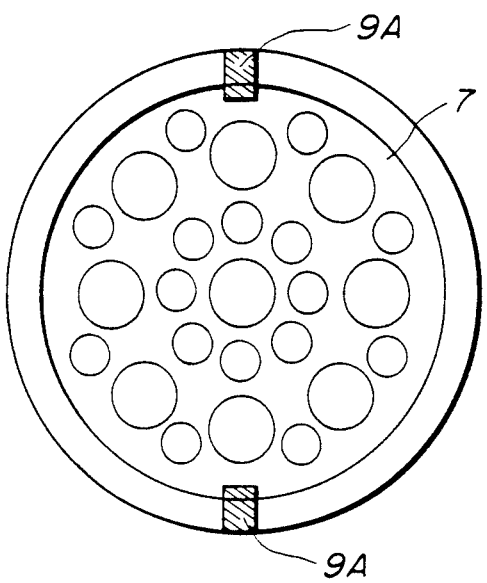
Figure 5D:
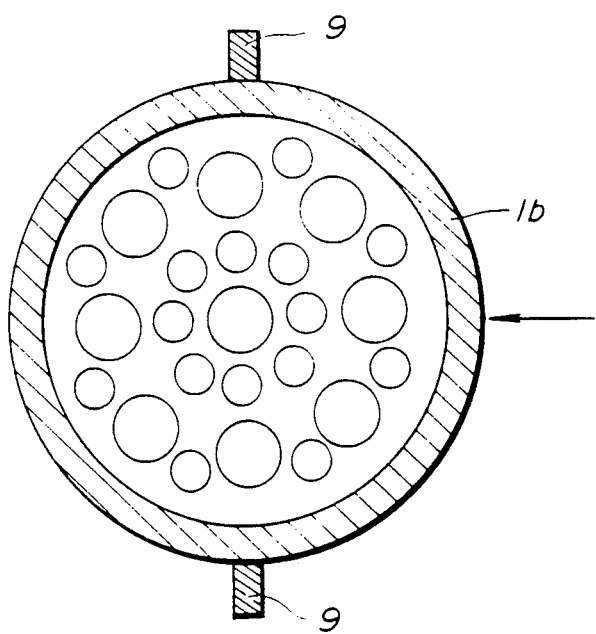
Figure 5C:
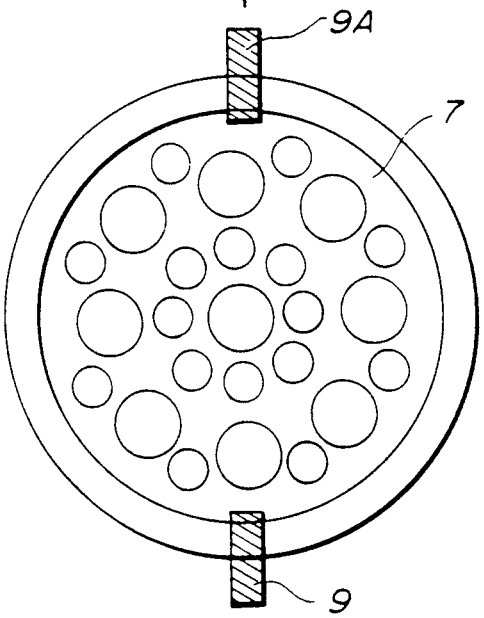

First, a disk shaped metallic foil 5 is prepared, see FIG. 5(a). A plurality of circular openings are provided in the metallic foil by etching. Next, an insulating film 6 and a metallic film 7 are laminated on the metallic foil 5 by a spattering method. A pair of metallic film electrodes 9A is also laminated on edge section of the metallic film 7. Openings are formed at areas which correspond to the openings 1C in the metallic foil formed by etching, see FIG. 5(b). Third, metallic strip electrodes 9 are bound to the metallic film electrodes 9A by solder. Finally, a support member 1b is installed on the outer surface. A flow rate sensor 1 according to the second embodiment is thereby made.

Similarly to the first embodiment, a flow rate sensor 1 is disposed perpendicularly to the stream direction of a medium within a flow passage. In addition, the flow rate sensor has a plurality of openings to allow the medium to pass therethrough without resistance. Thus, regardless of momentary flow variations, the flow rate element according to the second embodiment can determine flow rate of a medium flowing within the flow passage with no pressure loss to the medium.

What is claimed is:

1. An apparatus for measuring the flow rate of a medium within a passage, comprising:
   a temperature sensor for detecting a temperature of the medium flowing within the passage to provide a signal indicative thereof;
   first means including a single flow rate element made of an electrical resistance film which is arranged so as to allow the medium to flow therethrough for radiating heat energy to the medium uniformly over the entire stream area of a diameter section of the passage so as to maintain a difference in temperature between the medium detected by said temperature sensor and the heat energy radiated by the resistance film at a constant level, said flow rate element being formed in a honeycomb, the edges of which are disposed transversely to the flow direction within said passage;
   second means for determining the heat quantity transferred from said first means to the medium to provide a signal indicative thereof; and
   third means for determining the flow rate of the medium flowing within the passage based on the signal output from said second means.

2. An apparatus as set forth in claim 1, wherein said temperature sensor detects the temperature (Ta) of the medium flowing within the passage to provide a signal indicative thereof, said flow rate element has a surface area (S) and a resistance value (Rw), and said second and third means comprise a control circuit for applying a current to said flow rate element to generate heat having a temperature of (Tw), said control circuit controlling the current so as to maintain a value defined by the relation $(T_W - T_a) \times S/R_w$ at a constant level based on the signal output from the temperature sensor to determine the flow rate of the medium based on the magnitude of the current applied to the flow rate element.

3. An apparatus for measuring the flow rate of a medium within a passage, comprising:
   first means for radiating heat energy to the medium flowing within the passage at a plurality of points transversely offset from each other with respect to the flow direction of the medium;
   second means for determining the heat quantity transferred from said first means to the medium to provide a signal indicative thereof; and
   third means for determining the flow rate of the medium flowing within the passage based on the signal output from said second means;

wherein said first means is a flow rate element including a resistance film, said flow rate element is arranged so as to cover the entire stream area of a diameter section of the passage and includes a plurality of openings for allowing the medium to flow therethrough, and wherein said flow rate element is in the form of a honeycomb which is disposed transversely to the flow direction within the passage.

4. An apparatus for measuring the flow rate of air within an intake passage of an internal combustion engine, comprising:

a temperature sensor for detecting the temperature of air flowing within the intake passage to provide a signal indicative thereof;

a flow rate detecting element, provided within the intake passage, including an electrical resistance film arranged so as to generate heat energy to be dissipated to the flowing air at a plurality of points defined on a plane transverse to the flow direction of the air, said flow rate detecting element including a metallic foil having a plurality of substantially circular openings formed therein, an insulating film formed on said metallic foil and a metallic film formed on said insulating film, wherein the upstream surface of said film is the only impediment to said flow through said flow rate detecting element;

first means for determining the amount of heat required to be dissipated in the air to maintain a difference in temperature between the air detected by said temperature sensor and the heat energy generated by said resistance film at a constant level to provide a signal indicative thereof; and second means for determining the flow rate of the air flowing within the intake passage based on the signal from said first means.

5. An apparatus as set forth in claim 4, wherein said temperature sensor detects the temperature (Ta) of the medium flowing within the passage to provide a signal indicative thereof, said flow rate detecting element has a surface area (S) and a resistance value (Rw), and said first and second means comprise a control circuit for applying a current to said flow rate detecting element to generate heat having a temperature of (Tw), said control circuit controlling the current so as to maintain a value defined by the relation $(Tw-Ta) \times S/Rw$ at a constant level based on the signal output from the temperature sensor to determine the flow rate of the air based on the magnitude of the current applied to the flow rate element.

6. An apparatus for measuring the flow rate of air within an intake passage of an internal combustion engine, comprising:

a flow rate detecting element, provided within the intake passage, for generating a heat energy to be dissipated to the flowing air at a plurality of points defined on a plane transverse to the flow direction of the air, said flow rate detecting element having a plurality of openings for allowing the air to flow therethrough wherein said flow rate detecting element is a thin laminated film made of an insulating material and a conductive material in the form of a honeycomb;

first means for determining the amount of heat dissipated to the air by said flow rate detecting element to provide a signal indicative thereof; and second means for determining the flow rate of the air flowing within the intake passage based on the signal from said first means.

7. An apparatus for measuring the flow rate of a medium within a passage comprising: a flow rate sensor, including a metallic film formed as a plurality of honeycomb cells, mounted perpendicular to the flow of the medium through said passage; a temperature sensor mounted perpendicular to the flow of the medium through said passage and upstream of said flow rate sensor, said temperature sensor generating a signal indicative of the temperature of said medium within said passage; and a control unit coupled to said flow rate sensor and said temperature sensor, said control unit controls the supply of a current, indicative of the flow rate of said medium, to said flow rate sensor based on said signal generated by said temperature sensor in order to maintain the value of an equation $(Tw-Ta)S/Rw$ at a constant level; wherein Tw is a temperature of said metallic film, Ta is the temperature of said medium, S is the surface area of said metallic film and Rw is the electrical resistance provided by said metallic film.

8. An apparatus for measuring the flow rate of a medium within a passage comprising: a flow rate sensor, including a metallic foil having a plurality of substantially circular openings formed therein, an insulating film formed on said metallic foil and a metallic film formed on said insulating film, mounted perpendicular to the flow of the medium through said passage; a temperature sensor mounted perpendicular to the flow of the medium through said passage and upstream of said flow rate sensor, said temperature sensor generating a signal indicative of the temperature of said medium within said passage; and a control unit coupled to said flow rate sensor and said temperature sensor, said control unit controls the supply of a current, indicative of the flow rate of said medium, to said flow rate sensor based on said signal generated by said temperature sensor in order to maintain the value of an equation $(Tw-Ta)S/Rw$ at a constant level; wherein Tw is a temperature of said metallic film, Ta is the temperature of said medium, S is the surface area of said metallic film and Rw is the electrical resistance provided by said metallic film.

* * * * *